US011913867B2

(12) United States Patent
Yanik et al.

(10) Patent No.: US 11,913,867 B2
(45) Date of Patent: *Feb. 27, 2024

(54) PLASMOFLUIDIC MICROLENSES FOR LABEL-FREE OPTICAL SORTING OF BIOPARTICLES

(71) Applicant: The Regents of the University of California, Oakland, CA (US)

(72) Inventors: Ahmet Ali Yanik, Santa Cruz, CA (US); Xiangchao Zhu, Santa Cruz, CA (US); Yixiang Li, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/839,826

(22) Filed: Jun. 14, 2022

(65) Prior Publication Data

US 2022/0404259 A1     Dec. 22, 2022

Related U.S. Application Data

(63) Continuation of application No. 16/900,080, filed on Jun. 12, 2020, now Pat. No. 11,360,016.

(60) Provisional application No. 62/861,278, filed on Jun. 13, 2019.

(51) Int. Cl.
*G01N 15/10*     (2006.01)

(52) U.S. Cl.
CPC . *G01N 15/1056* (2013.01); *G01N 2015/1006* (2013.01); *G01N 2015/1081* (2013.01); *G01N 2015/1087* (2013.01)

(58) Field of Classification Search
CPC .......... G01N 15/0255; G01N 15/1056; G01N 15/0288; G01N 15/1006; G01N 15/1081; G01N 15/1087
See application file for complete search history.

(56) References Cited

U.S. PATENT DOCUMENTS

| | | | |
|---|---|---|---|
| 5,245,466 A | 9/1993 | Burns | |
| 6,744,038 B2 | 6/2004 | Wang | |
| 7,704,294 B2 * | 4/2010 | Ariessohn | G01N 1/2202 209/143 |
| 11,360,016 B2 * | 6/2022 | Yanik | G01N 15/1056 |
| 2002/0121443 A1 | 9/2002 | O'Connell | |
| 2006/0177940 A1 | 8/2006 | Furst | |

(Continued)

OTHER PUBLICATIONS

Ashkin, A. et al., "Optical Trapping and Manipulation of Viruses and Bacteria", Science, Mar. 20, 1987, New Series, vol. 235, No. 4795, pp. 1517-1520.

(Continued)

*Primary Examiner* — Joseph C Rodriguez

(74) *Attorney, Agent, or Firm* — Carter, DeLuca & Farrell LLP

(57) ABSTRACT

An optofluidic device includes: a housing having an inlet port coupled to an inlet side and an outlet port coupled to an outlet side; and a microlens disposed within the housing between the inlet side and the outlet side. A fluid having a plurality of particles flows from the inlet side through the microlens to the outlet side. The optofluidic device further includes a light source configured to emit a light beam in a direction opposite flow direction of the fluid, the light beam defining an optical axis that is perpendicular to the microlens.

22 Claims, 9 Drawing Sheets

(56) References Cited

U.S. PATENT DOCUMENTS

| | | | |
|---|---|---|---|
| 2007/0091442 | A1 | 4/2007 | MacDonald |
| 2008/0182758 | A1* | 7/2008 | Ugolin ............... G01N 33/5438 506/17 |
| 2009/0032730 | A1* | 2/2009 | Erickson ............ G02B 6/02347 250/435 |
| 2010/0047761 | A1 | 2/2010 | MacDonald |
| 2012/0273664 | A1 | 11/2012 | Grier |
| 2014/0220557 | A1 | 8/2014 | Hart |
| 2022/0221392 | A1* | 7/2022 | Berezhnyy ......... G01N 15/1459 |
| 2022/0326139 | A1* | 10/2022 | Kajihara .................. G02B 5/26 |

OTHER PUBLICATIONS

Baffou, G. et al., Mapping Heat Origin in Plasmonic Structures, Physical Review Letters, Apr. 2, 2010, PRL 104, 136805(1)-136805(4).

Dennis, Mark R., et al., "The Plasmon Talbot Effect", Optics Express, Jul. 23, 2007, vol. 15, No. 15, pp. 9692-9700.

Donner, Jon S., et al., "Plasmon-Assisted Optofluidics", American Chemical Society, vol. 5, No. 7, pp. 5457-5462.

Ebbesen, T.W., et al., Extraordinary Optical Transmission Through Sub-Wavelength Hole Arrays, Nature, Feb. 12, 1998, vol. 391, pp. 667-669.

Gao, H., et al., "Broadband Plasmonic Microlenses Based on Patches of Nanoholes", Nano Lett., 2010, vol. 10, pp. 4111-4116.

Gardiner, Chris, et al., "Measurement of Refractive Index by Nanoparticle Tracking Analysis Reveals Heterogeneity in Extracellular Vesicles", Journal of Extracellular Vesicles, 2014, vol. 3, p. 25361 (1-6).

Genet, C., et al., "Light in Tiny Holes", Nature Publishing Group, 2007, vol. 445, Jan. 4, 2007, pp. 39-46.

Ghaemi, H.F., et al., "Surface Plasmons Enhance Optical Transmission Through Subwavelength Holes", The American Physical Society, Sep. 15, 1998, vol. 58, No. 11, pp. 6779-6782.

Hart, Sean J., et al., Refractive-Index-Driven Separation of Collodial Polymer Particles Using Optical Chromatography, Appl. Phys. Lett. 83, 5316 (2003).

Hart, Sean J., et al., "Discovery of a Significant Optical Chromatographic Difference between Spores of Bacillus anthracis and its Close Relative, Bacillus Thuringiensis", Analytical Chemistry, vol. 8, No. 9, May 1, 2006, pp. 3221-3225.

Hebert, Colin G., et al. "Toward Label-Free Optical Fractionation of Blood—Optical Force Measurements of Blood Cells", Anal. Chem. 2011, vol. 83, 5666-5672.

Huang, Fu Min, et al., "Nanohole Array as a Lens", Nano Letters, vol. 2008, vol. 8, No. 8, pp. 2469-2472.

Huang, Min, et al., "Sub-wavelength Nanofluidics in Photonic Crystal Sensors", Optics Express, Dec. 21, 2009, vol. 17, No. 26, pp. 24224-24233.

Imasaka, Totaro, et al., Optical Chromatography, Analytical Chemistry, vol. 67, No. 11, Jun. 1, 1995, pp. 1763-1765.

Kaneta, Takashi, et al., "Theory of Optical Chromatography", American Chemical Society, vol. 69, No. 14, Jul. 15, 1997, pp. 2701-2710.

Kim, Jaeyoun, "Joining Plasmonics with Microfluidics: From Convenience to Inevitability", The Royal Society of Chemistry, Lab Chip, 2012, vol. 12, pp. 3611-3623.

Ma, Zhen, et al., "Laser-Guidance Based Detection of Cells With Single-Gene Modification", Applied Physics Letters, vol. 92, (2008), p. 213902.

Makihara, Jun, et al., "Optical Chromatography Size Determination by Eluting Particles", Talanta, vol. 48, (1999), pp. 551-557.

Moreno, L., et al., "Theory of Extraordinary Optical Transmission Through Subwavelength Hole Arrays", Physical Review Letters, vol. 86, No. 6, Feb. 5, 2001, pp. 1114-1117.

Mittal, Sukant, et al., "Discontinuous Nanoporous Membranes Reduce Non-Specific Fouling for Immunoaffinity Cell Capture", Small, 2013, vol. 9, No. 24, pp. 4207-4214.

Ndukaife, Justus C., "Long-Range and Rapid Transport of Individual Nano-Objects by a Hybrid Electrothermoplasmonic Nanotweezer", Nature Nanotechnology, vol. 11, Jan. 2016.

Oh, Kwang, W., et al., "Design of Pressure-Driven Microfluidic Networks Using Electric Circuit Analogy", Lab Chip, 2012, vol. 12, pp. 515-545.

Okamoto, K., "Radiation Force Exerted on Subwavelength Particles Near a Nanoaperture", Physical Review Letters, Nov. 29, 1999, vol. 83, No. 22, pp. 4534-4537.

Roxworthy, Brian J., "Understanding and Controlling Plasmon-Induced Convection", Nature Communications, DOI: 10.1038/ncomms4173, 5:3173.

Ruffieux, Patrick, et al., "On the Chromatic Aberration of Microlenses", Optics Express, May 29, 2006, vol. 14, No. 11, pp. 4687-4694.

Saxena, Sumit, et al., "Plasmonic Micro Lens for Extraordinary Transmission of Broadband Light", Scientific Reports, 4:5586, DOI: 10.1038/srep05586.

Steen, Harald B., "Flow Cytometer for Measurement of the Light Scattering of Viral and Other Submicroscopic Particles", Cytometry, Part A 57A: 94-99 (2004).

Taylor, Joseph D., et al., "Analytical Particle Measurements in an Optical Microflume", Analytica Chimica Acta 670 (2010) 78-83.

Terray, A., et al., "Cascade Optical Chromatography for Sample Fractionation", American Institute of Physics, Biomicrofluidics 3, 044106 (2009).

Terray, A., et al., "Cascade Optical Chromatographic Sample Separation of Hydrodynamically Focused Mixtures", American Institute of Physics, Biomicrofluidics 8, 064102 (2014).

Van Der Pol, E., et al., "Innovation in Detection of Microparticles and Exosomes", J. Thromb Haemost, 2013, 11 (Suppl. 1):36-45.

Van Der Pol, E., et al., "Particle Size Distribution of Exosomes and Microvesicles Determined by Transmission Electron Microscopy, Flow Cytometry, nanoparticle Tracking Analysis, and Resistive Pulse Sensing", J. Thromb Haemost, 2014, 12, 1182-1192.

Van Der Pol, E., et al. "Absolute Sizing and Label-Free Identification of Extracellular Vesicles by Flow Cytometry", Nanomedicine: Nanotechnology, Biology and Medicine 14, (2018) 801-810.

Verslegers, Lieven, et al., "Planar Lenses Based on Nanoscale Slit Arrays in a Metallic Film", Nano Letters, 2009, vol. 9., No. 1., 235-238.

Vogel, R., et al., "Quantitative Sizing of Nano/Microparticles with a Tunable Elastomeric Pore Sensor", Anal. Chem. 2011, 83, 3499-3506.

Wang, X., et al., "General Expressions for Dielectrophoretic Force and Electrorotational Torque Derived Using the Maxwell Stress Tensor Method", Journal of Electrostatics 39, (1997) 277-295.

Wang, S., et al., "Label-free Imaging, Detection, and Mass Measurement of Single Viruses by Surface Plasmon Resonance", PNAS Early Edition: www.pnas.org/cgi/doi/10.1073/pnas. 1005264107, pp. 1-5.

Yanik, Ahmet, Ali., et al., "Extraordinary Midinfrared Transmission of Rectangular Coaxial Nanoaperature Arrays", Appl. Phys. Lett. 93, 081104 (2008).

Yanik, Ahmet, Ali., et al., "Integrated Nanoplasmonic-Nanofludic Biosensors with Targeted Delivery of Analytes", Appl. Phys. Lett. 96, 021101 (2010).

Yanik, Ahmet, Ali., et al., "Seeing Protein Monolayers with Naked Eye Through Plasmonic Fano Resonances", PNAS, Jul. 19, 2011, vol. 108, No. 29, pp. 11784-11789.

Tebert, Colin G., et al. "Toward Label-Free Optical Fractionation of Blood—Optical Force Measurements of Blood Dells", Anal. Chem. 2011, vol. 83, pp. 5666-5672.

Huang, Fu Min, et al., "Nanohole Array as a Lens", Nano Letters, vol. 2008, vol. 8, No. 8, pp. 2469-2472. (Undated).

Masaka, Totaro, et al., "Optical Chromatography", Analytical Chemistry, vol. 67, No. 11, Jun. 1, 1995, pp. 1763-1765.

Makihara, Jun, et al., "Optical Chromatography Size Determination by Eluting Particles", Taianta, vol. 48, (1999), pp. 551-557.

Roxworthy, Brian J., "Understanding and Controlling Plasmon-Induced Convection", Nature Communications, DOI 10.1038/ncomms4173,5:3173. (Undated).

(56) References Cited

OTHER PUBLICATIONS

Saxena, Sumit, et al., "Plasmonic Micro Lens for Extraordinary Transmission of Broadband Light", Scientific Reports, 4:5586, DOI: 10.1038/srep05586. Undated).
Steen, Harald B., "Flow Cytometer for Measurement of the Light Scattering of Viral and Other Submicroscopic Particles", Cytometry, Part 57A, pp. 94-99 (2004).
Taylor, Joseph D., et al., "Analytical Particle Measurements in an Optical Microflume", Analytica Chimica Acta 670 (2010) pp. 78-83.
Man Der Pol, E., et al., "Innovation in Detection of Microparticles and Exosomes", J. Thromb Haemost, 2013, 11 (Suppl. 1): pp. 36-45.
Man Der Pol, E., et al., "Particle Size Distribution of Exosomes and Microvesicles Determined by Transmission Electron Microscopy, Flow Cytometry, Nanoparticle Tracking Analysis, and Resistive Pulse Sensing", J. Thromb Haemost, 2014, 12, pp. 1182-1192.
Van Der Pol, E., et al. "Absolute Sizing and Label-Free Identification of Extracellular Vesicles by Flow Cytometry", Nanomedicine: Nanotechnology, Biology and Medicine 14, (2018) pp. 801-810.
Verslegers, Lieven, et al., "Planar Lenses Based on Nanoscale Slit Arrays in a Metallic Film", Nano Letters, 2009, vol. 3., No. 1, pp. 235-238.
Vogel, R., et al., "Quantitative Sizing of Nano/Microparticles with a Tunable Elastomeric Pore Sensor", Anal. Chem. 2011, 83, pp. 3499-3506. (Undated}.
Wang, X., et al., "General Expressions for Dielectrophoretic Force and Electrorotational Torque Derived Using the Maxwell Stress Tensor Method", Journal of Electrostatics 39, (1997) pp. 277-295.
Wang, S., et al., "Label-free Imaging, Detection, and Mass Measurement of Single Viruses by Surface Plasmon Resonance", PNAS Early Edition: www pnas org/cgi/doi/10.1073/pnas.1005264107, pp. 1-5. (Undated).
Yanik, Ahmet, AIL, et al., "Extraordinary Midinfrared Transmission of Rectangular Coaxial Nanoaperature Arrays", Appl. Phys. Lett. 93, 081104 (2008).
Yanik, Ahmet, AIL, et al., "Integrated Nanoplasmonic-Nanofludic Biosensors with Targeted Delivery of Analytes", Appl. Phys. Lett. 96, 021101 (2010).
Yanik, Ahmet, AIL, et al., "Seeing Protein Monolayers with Naked Eye Through Plasmonic Fano Resonances", PNAS, Jul. 19, 2011, vol. 108, No. 29, p. 11784-11789.

* cited by examiner

PLASMOFLUIDIC MICROLENSES FOR LABEL-FREE OPTICAL SORTING OF BIOPARTICLES

CROSS-REFERENCE TO RELATED APPLICATION

The present application is a continuation of U.S. patent application Ser. No. 16/900,080, filed on Jun. 12, 2020, now U.S. Pat. No. 11,360,016, which claims the benefit of and priority to U.S. Provisional Application No. 62/861,278, filed on Jun. 13, 2019. The entire disclosure of each of the foregoing applications are incorporated by reference herein.

GOVERNMENT LICENSE RIGHTS

This invention was made with Government support under Grant Nos. ECCS 1611290 and ECCS 1847733, awarded by the National Science Foundation. The Government has certain rights in the invention.

BACKGROUND

Optical chromatography is an optofluidic technique enabling label-free fractionation of microscopic particles, e.g., bioparticles from heterogenous mixtures. This technique relies on a mildly focused Gaussian laser beam along a microfluidic channel to create opposing optical scattering and fluidic drag forces. Variable strength and balance of these forces may be harnessed for selective sorting of bioparticles based on their size, composition, and morphology. Initially demonstrated for size-based elution of polystyrene beads, optical chromatography has been successfully applied to fractionation of blood components such as human erythrocytes, monocytes, granulocytes, and lymphocytes. This technique particularly excels in distinguishing bioparticles with subtle differences. Its highly precise separation capability has been recently demonstrated for micron size bioparticles with diameters that differ by less than 70 nm. Thus, optical chromatography offers unique capabilities as a modern separation technique, especially when combined with multi-stage sequential fractionation and microfluidic network-based purification approaches. However, several critical limitations must be overcome for its wide adaptation. In order to create strong optical scattering forces along the microfluidic channels, high cost laser sources are needed. Such solutions require that a laser beam must be precisely aligned along the fluidic channel with a well-controlled beam waist profile, requiring a complicated optical alignment procedure that employs multiple multi-axis positioners. Thus, scaling of existing optical chromatography techniques for multiplexed and high throughput operation is not currently practical, since each channel requires separate alignment of sensitive and high-cost laser sources and objectives.

Accordingly, there is a need for a system and method which overcomes the shortcoming of existing optical chromatography systems and methods by eliminating the need for sophisticated instrumentation and precise alignment requirements and provide for objective-free focusing and self-alignment of opposing optical scattering and fluidic drag forces for selective separation of exosome size bioparticles.

SUMMARY

The present disclosure provides a subwavelength (e.g., less than about 200 nm) thick optofluidic plasmonic microlens that achieves objective-free focusing and self-alignment of counteracting optical scattering and fluidic drag forces for selective separation of exosome size bioparticles. The optofluidic plasmonic microlens provides a self-collimating mechanism for particle trajectories with a spatial dispersion that is inherently minimized by the optical gradient and radial fluidic drag forces working together to align the particles along an optical axis. The system according to the present disclosure facilitates separation of small size bioparticles (e.g., exosomes) from a heterogenous mixture through negative depletion and provides a robust selective separation capability for same size nanoparticles based on their differences in chemical composition. Unlike existing optical chromatography techniques that require complicated instrumentation (e.g., lasers, objectives, and precise alignment stages), optofluidic plasmonic microlenses on a micrometer scale, e.g., about 4 μm×4 μm, allow for multiplexed and high-throughput sorting of nanoparticles using low-cost broadband light sources.

An optofluidic device according to the present disclosure includes a center nanoaperture integrated with an optofluidic plasmonic microlens providing objective-free focusing and self-alignment of counteracting optical scattering and fluidic drag forces without degrading the optical focusing mechanism. The optofluidic plasmonic microlens allows for selective sorting based on size and composition.

In embodiments, a plurality of microlenses and their associated light sources may be arranged in parallel, with each of the microlenses configured to sort particles having a specific size. In addition to parallel operation, laterally integrated optofluidic plasmonic microlenses according to the present disclosure may be incorporated on a planar chip and permit serial microfluidic schemes to be readily implemented for multi-stage sequential separation and purification using broadband light sources and conventional planar microfluidic approaches. The optofluidic sorting scheme based on optofluidic plasmonic microlenses of the present disclosure enables selective separation of exosome size bioparticles (e.g., less than about 200 nm in diameter). Furthermore, the system offers readily tunable, highly reliable and selective separation of nano-sized bioparticles by adjusting the light intensity (i.e. radiation pressure) and/or the fluid flow rate (i.e. opposing drag force) based on size and minor difference in chemical makeup (i.e. refractive index).

Tunable resistive pulse sensing (TRPS) may also be used with the microlens according to the present disclosure for label-free single-particle (e.g. viruses, nucleotides) quantification and size profiling of vesicles (e.g. exosomes) in electrolyte solutions by utilizing the Coulter principle. In combination with microfluidic or nanofluidic systems, this method shows great potential for a broad range of bioanalytical applications. However, TRPS measurements of heterogenous biological samples using conventional microfluidic or nanofluidic systems suffer from major practical limitations, e.g. the pore may be clogged by particles or aggregates of particles that are larger than the pore. In particular, such limitations are consistently seen in measurements of exosomes that are shown to be polydisperse in size and prone to spontaneous aggregation. Pore blockage issues may be mitigated by frequently pausing the measurement and/or mechanical agitation or stretching of pore membrane to dislodge the trapped particle. However, this approach inevitably results in increased complexity and processing time of the TRPS procedure, thereby reducing its overall throughput. Furthermore, this may also alter the dimension of the sensing zone leading to repeated calibration measurements. In addition, this mitigation method also reduces system sensitivity and stability due to undesirable adherence of particles on the pore surface.

The microlens according to the present disclosure prevents clogging of nanoapertures routinely used for Coulter principle devices such as nanopore, and resistive pulse sensing, by keeping larger diameter particles away from the nanoaperture opening using optical scattering forces. Furthermore, the microlens integrates both functionalities into the same platform realizing size-based sorting and Coulter principle sensing of exosome size bioparticles. In addition, the optofluidic platform may be operated for extended periods of time and allows for high-volume processing by incorporating a lateral micro cross flow for periodically removing the particle micro fumes that build up above the focal point of the microlens.

According to one embodiment of the present disclosure, an optofluidic device is provided. The optofluidic device includes: a housing having an inlet port coupled to an inlet side and an outlet port coupled to an outlet side; and a microlens disposed within the housing between the inlet side and the outlet side. A fluid having a plurality of particles flows from the inlet side through the microlens to the outlet side. The optofluidic device further includes a light source configured to emit a light beam in a direction opposite flow direction of the fluid, the light beam defining an optical axis that is perpendicular to the microlens.

According to one aspect of the above embodiment, the microlens is configured to selectively separate the plurality of particles based on at least one of particle size or refractive index of the plurality of particles. Adjustment of at least one of intensity of the light beam or fluid flow rate adjusts selectivity of the microlens.

According to one embodiment of the present disclosure, a method for selectively separating a plurality of particles disposed in a fluid through an optofluidic device is provided. The method includes: supplying the fluid into an inlet port coupled to an inlet side of a housing and removing the fluid from an outlet port coupled to an outlet side of the housing. The method further includes passing the fluid through a microlens disposed within the housing between the inlet side and the outlet side, wherein the fluid flows from the inlet side through the microlens to the outlet side; and emitting a light beam from a light source in a direction opposite flow direction of the fluid, the light beam defining an optical axis that is perpendicular to the microlens.

According to one aspect of the above embodiment, the method further includes selectively separating the plurality of particles based on at least one of particle size or refractive index of the plurality of particles.

According to another aspect of the above embodiment, the method further includes adjusting one of at least one of intensity of the light beam or fluid flow rate to adjust selectivity of the microlens.

According to a further aspect of any of the above embodiments, the microlens includes a metal layer, a membrane layer, and an adhesion layer disposed between the metal layer and the membrane layer. The metal layer is formed from gold and has a thickness of about 120 nm. The adhesion layer is formed from titanium and has a thickness of about 10 nm. The membrane layer is a suspended silicon nitride membrane having a thickness of about 100 nm.

According to another aspect of any of the above embodiments, the microlens has a thickness that is less than a wavelength of the light beam. The microlens includes an array of apertures having a diameter of about 150 nm. The microlens further includes a center aperture disposed at a center of the array, the center aperture having a diameter from about 150 nm to about 800 nm. In certain aspects, the diameter may be about 500 nm.

BRIEF DESCRIPTION OF DRAWINGS

Various embodiments of the present disclosure will be described herein below with reference to the figures wherein.

DETAILED DESCRIPTION

The present disclosure provides an optofluidic plasmonic microlens having periodic or quasi-periodic arrays of plasmonic nanoapertures, i.e., a finite size nanohole array (NHA), which is used as a micro-convex lens focusing incident plane light from a light source to dimensions comparable to optical wavelengths. In addition to the small size (e.g., nanoscale) of the microlens, this focusing capability is used to realize large optical scattering forces using a collimated broadband light source. In particular, the finite size NHA microlens provides a broadband focusing capability that can be controlled by the overall size of the array and is tolerant of substructural variations. The light focusing property of the microlens allows for nanofluidic integration through alterations in array design without degrading their focusing characteristics.

Figure 1:
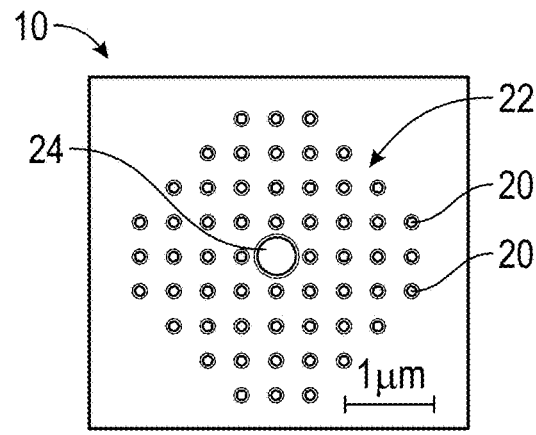
FIG. 1 is a plan view of an optofluidic plasmonic microlens including a patch array of circular nanoapertures and an enlarged center aperture for nanofluidic integration according to the present disclosure.
Figure 2:
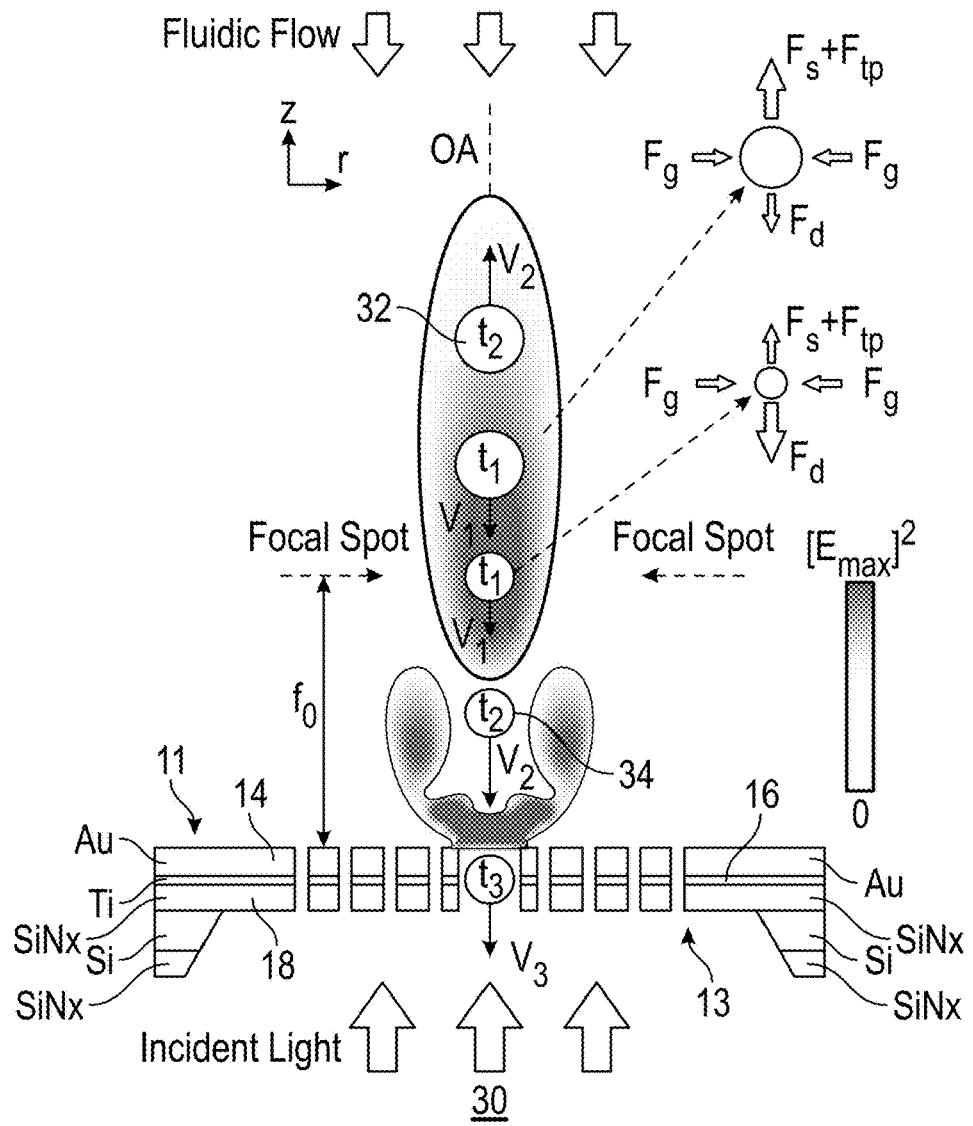
FIG. 2 is a schematic diagram of a side cross-sectional view of the microlens of FIG. 1 showing separation of differently sized particles at a focal point region of the microlens according to the present disclosure.

With reference to FIGS. 1 and 2, an optofluidic plasmonic NHA microlens 10 includes a metal layer 14, an adhesion layer 16, and a membrane layer 18. The metal layer 14 may be formed from gold and may have a thickness from about 50 nm to about 200 nm, and in embodiments may be about 120 nm. The adhesion layer 16 may be formed from titanium and may have a thickness from about 5 nm to about 20 nm, and in embodiments may be about 10 nm. The adhesion layer 16 is disposed between the membrane layer 18 and the metal layer 14. The adhesion layer 16 may be formed from a suspended silicon nitride (Si3N4) membrane having a thickness from about 50 nm to about 200 nm, and in embodiments may be about 100 nm. The thickness of the microlens 10 may be from about 100 nm to about 500 nm, in embodiments from about 200 nm to about 300 nm. In further embodiments, the thickness of the microlens 10 is less than the wavelength of incident a light beam 30 (FIG. 2) applied to the microlens 10 as described below.

With reference to FIG. 1, the microlens 10 includes a plurality of apertures 20 arranged in an n×n array 22, where n may be from about 3 to about 20. In embodiments, the array 22 may be a 9×9 array as shown in FIG. 1. In further embodiments, the array may be an n×m array, where n and m are different and each of n and m may be from about 3 to about 20. The apertures 20 may have a periodicity from about 300 nm to about 500 nm, and in embodiments may be about 380 nm. Periodicity is the distance between each of the apertures 20. In embodiments, the array 22 may be a tapered array as shown in FIG. 1, where each of the corners of the array 22 are cut off, such that there are no apertures at corner positions.

As shown in FIG. 2, the apertures 20 pass from one side, i.e. inlet side 11, of the microlens 10 to the other side, i.e. outlet side 13, of the microlens 10. Each of the apertures 20 may have a diameter from about 100 nm to about 200 nm, and in embodiments, may be about 150 nm. The microlens 10 may have a width w and a length 1 which may be the same or different and each of which may be of any suitable dimensions to accommodate the array 22. In embodiments, each of the width w and the length 1 may be from about 1 µm to about 10 µm, in embodiments the width w and the length 1 may be from about 2 µm to about 6 µm.

The microlens 10 also includes a center aperture 24 having a larger diameter dc than the apertures 20 and is disposed at a center of the array 22. The diameter dc of the center aperture 24 may be from about 300 nm to about 800 nm, and in embodiments may be from about 400 to about 600 nm, and in further embodiments may be about 500 nm. The diameter of the center aperture 24 may be from about 2 to about 4 times larger than the diameter of the apertures 20. The center aperture 24 has an enlarged diameter to facilitate nanofluidic flow and the array 22 allows for enhanced light transmission due to extraordinary optical transmission effect (EOT), which is a phenomenon of enhanced transmission of light through a subwavelength aperture in an otherwise opaque metallic film which has been patterned with a regularly repeating periodic structure.

Figure 3:
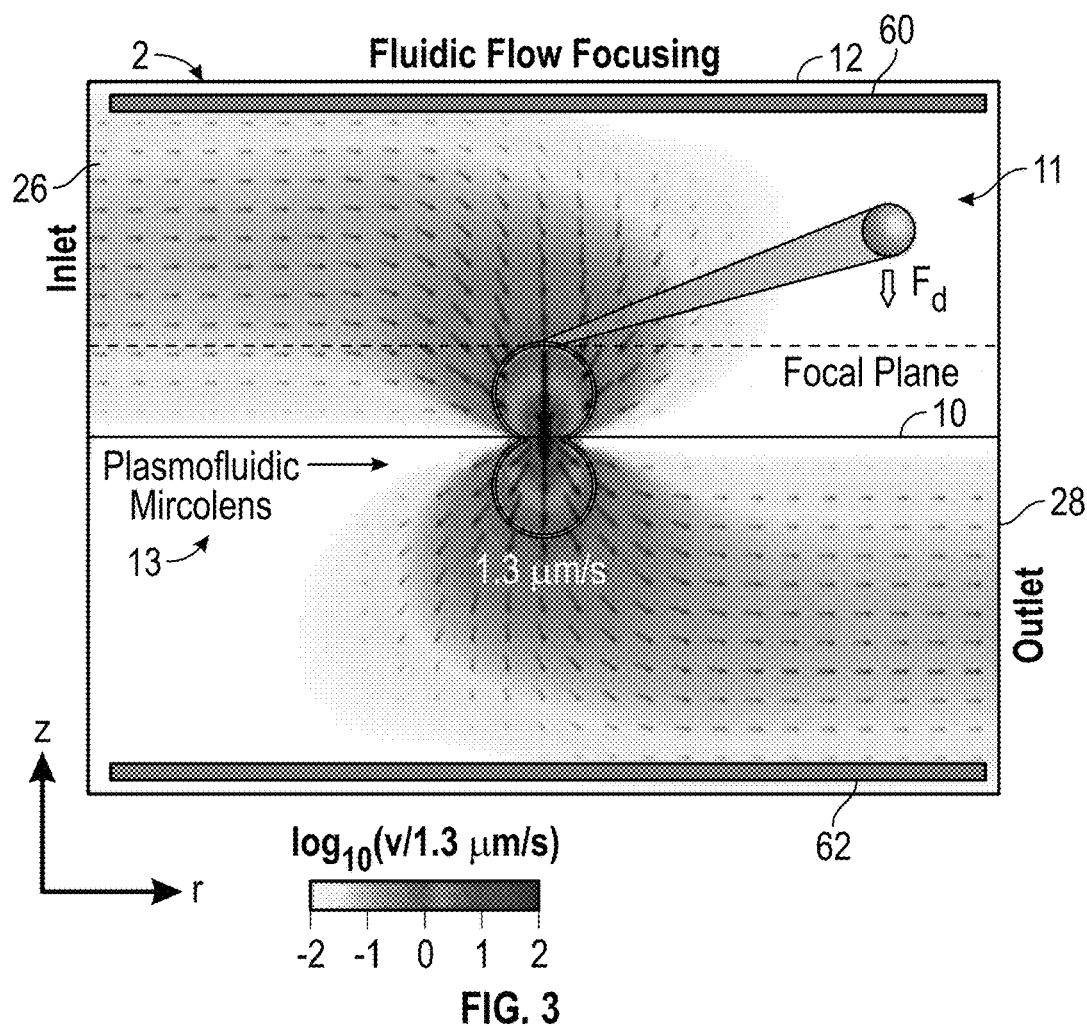
FIG. 3 is a schematic diagram of a side cross-sectional view of an optofluidic apparatus including the microlens of FIG. 1 illustrating a fluidic flow profile through the microlens according to the present disclosure.

As shown in FIG. 3, the microlens 10 may be used in an optofluidic apparatus 2 having a housing 12. Fluid containing particles of interest, i.e., those sorted by the microlens 10, is supplied, e.g., pumped, from an inlet port 26 on the side of inlet side 11 and extracted through an outlet port 28 on the side of the outlet side 13. Accordingly, the fluid passes through the center aperture 24. The inlet port 26 and the outlet port 28 may be defined in the housing 12 enclosing the microlens 10. The housing 12 may be formed from a transparent material to allow for transmission of light. The inlet port 26 and the outlet port 28 are located away from the microlens 10 to provide a clear path for the light beam 30, which may be provided by any suitable light source.

Fluid flow may be characterized using Hagen-Poiseille's law as shown in formula (1):

$$Q = \Delta p / R_H [\text{m3 s}-1] \tag{1}$$

In formula (1) the pressure-driven flow through a circular aperture of length h, such as the center aperture 24, can be expressed using hydraulic resistance $R_H$, which is inversely proportional to the fourth power of the aperture radius based on formula (2):

$$R_H \approx 8\mu h / \pi r^4_H [\text{Pa s3 m}-1] \tag{2}$$

In formula (2), $\mu = 8.9 \times 10-4$ Pa·s is the dynamic viscosity of water and h, which is the cylindrical conduit thickness of the center aperture 24.

The conduit thickness depends on the thickness of the microlens 10, namely, the combined thickness of the metal layer 14, the adhesion layer 16, and the membrane layer 18, is expressed by formula (3):

$$h = t_{Au} + t_{Ti} + t_{SiN} \tag{3}$$

For the center aperture 24 (e.g., having a diameter dc of about 500 nm) the hydraulic resistance may be more than about two orders of magnitude smaller than that of the smaller apertures 20 (e.g., having a diameter d of about 150 nm). In embodiments, the diameter dc may be from about 150 nm to about 800 nm. The least fluidic resistance path through the center aperture 24 leads to focusing of the convective fluidic flow along an optical axis (OA), as demonstrated in finite-element (FEM) microfluidic calculations shown in FIG. 3. The optical axis passes through the center aperture 24 and is perpendicular to the microlens 10, as such the apertures 20 and the center apertures 24 are aligned (i.e. parallel) with the optical axis. The flow of the fluid through the center aperture 24 supplies nanoparticles to the focal point of the microlens 10 and forces nanoparticles to follow a trajectory that passes through the optical axis, as illustrated in FIG. 2.

Optofluidic alignment is achieved by introducing a collimated light beam that is perpendicularly incident relative to the outlet side 13 of the microlens 10 as shown in FIG. 2. Light beam is transmitted along the optical axis and through the center aperture 24 in a direction from the outlet side 13 to the inlet side 11 counter to the fluid flow. The light beam may be from any suitable light source such as light emitting diodes (LEDs) or lasers, which provide a high-intensity light for transmission through the housing 12. Light source may have a wavelength from about 600 nm to about 800 nm, and in embodiments from about 620 nm to about 680 nm. The light source may have a power output from about 10 mW to about 200 mW, and in embodiments from about 20 mW to about 100 mW. The light beam 30 is focused by the microlens 10 producing an optical scattering force (Fs) in the direction of the incident light that is aligned against the fluidic drag force (Fg) along the optical axis. The microlens 10 may also be heated to establish a temperature gradient and heat-induced convection current. The resulting thermo-plasmonic drag force (Ftp) contributes to the optical scattering processes in balancing the fluidic drag. As illustrated in FIG. 2, in addition to providing a scattering force (Fs) along the optical axis, light focused through the microlens 10 introduces an optical gradient force (Fg) that radially pushes particles towards the optical axis. Combined with the radial drag forces (Fd,r), at the focal point region, optical gradient force provides a robust mechanism for precise alignment of particles along the optical axis, as illustrated in FIG. 2.

With reference to FIG. 2, for sufficiently large optical pressures that overcome the fluidic drag force (i.e. Fs>Fd), particles are propelled against the fluidic flow along the optical axis. Hence, larger and higher refractive index particles 32 experiencing larger optical scattering forces are kept at a distance away from the inlet side 11, whereas the smaller diameter and lower refractive index particles 34 are allowed to pass through the center aperture 24, resulting in complete separation of small size bioparticles (i.e., exosomes) from a mixture of larger size particles through negative depletion. Here, the microlens 10 serves as a far-field screen that prevents clogging of the center aperture 24 by keeping larger particles 32 away from the inlet side 11 and high flow rate regions close to the center aperture 24. The diameter dc of the center aperture 24 controls the size exclusion range in addition to the focusing behavior of the microlens 10. The diameter dc of the center aperture 24 is sized such that the center aperture does not deteriorate the focusing characteristics and the desired size selectivity.

With continued reference to FIG. 2, optical scattering forces acting on a particle can be decomposed into two orthogonal components: a radial gradient force (Fg) directed towards the optical axis and optical scattering force (Fs) in the direction of beam propagation and counter the fluidic flow. These forces can be expressed by formula (4):

$$F_{s,g} = \frac{2n_m P}{c} Q_{s,g} \quad (4)$$

In formula (4), P is the power of the incident light, nm is the refractive index of the medium, c is the speed of light, and Qs,g is a dimensionless parameter defined for the scattering (s) and gradient (g) forces. Qs,g represents the efficiency of optical pressure transfer as a result of the light reflection/refraction at material interfaces. For simple beam profiles and symmetric geometries (i.e., a mildly focused Gaussian beam acting on a spherical particle), Qs,g may be calculated analytically. For more complex beam profiles and small size particles with a diameter a <1 μm, instead of the ray-optics model, optical forces may be calculated using Maxwell stress tensor (MST) as shown in formula (5):

$$T_{ij} = \varepsilon E_i E_j^* + \mu H_i H_j^* - \frac{1}{2}\delta_{ij}\left(\varepsilon|E|^2 + \mu|H|^2\right) \quad (5)$$

In formula (5), E and H are the electric and magnetic field vectors, $\square\square$ and $\square$ are the electric permittivity and magnetic permeability of the medium, and $\square$ij is the Kronecker delta. Combined with finite-difference time-domain (FDTD) simulations, MST may be used to determine scattering and gradient forces acting on a particle for an arbitrarily shaped electromagnetic (EM) field distribution. Assuming a bounding box, small enough to contain only the particle of interest, the net optical force on the particle may be calculated using formula (6):

$$F = \oint_s \sum_j \frac{1}{2} \text{Re}(T_{ij}\hat{n}_j) \quad (6)$$

In formula (6), S is the surface of the bounding box and $\hat{n}_j$ is a unit vector along one of the principal axes.

For light intensities described in the present disclosure, electromagnetic heating of the microlens 10 may lead to large enough local temperature gradients inducing a buoyancy-driven convective flow away from the inlet side 11. Contribution of thermo-plasmonic effects may be incorporated using finite element method (FEM). Initially, the electromagnetic wave equation for the electric field E around the microlens 10 with the center aperture 24 having a diameter of about 500 nm may be calculated using the formula (7):

$$\nabla \times (\nabla \times E) - k_0^2 \varepsilon(r) E = 0 \quad (7)$$

In formula (7), k0=2π/λ is the free-space wave number, ε(r) the position-dependent complex dielectric permittivity at the incident light wavelength. The calculated electric field distribution may be used to obtain the heat source density using formula (8):

$$q(r) = 0.5\text{Re}[J \cdot E^*]. \quad (8)$$

In formula (8), J is the induced current density in the microlens 10 and the total heat power calculated using formula (9):

$$Q = \int q(r) dv. \quad (9)$$

Steady-state heat transfer and incompressible Navier-Stokes relations may then be used to calculate the temperature and thermo-plasmonic velocity field distributions using formulas (10) and (11):

$$\nabla \cdot [\rho c_p T(r) u(r) - \kappa \nabla T(r)] = Q(r) \quad (10)$$

$$\rho_0 [u(r) \cdot \nabla] u(r) + \nabla p(r) - \eta \nabla^2 u(r) = F \quad (11)$$

In formulas (10) and (11), ∇·u=0, T(r), u(r), and p(r) are the spatial temperature, fluid velocity, and pressure distributions, respectively. The material parameters for thermal conductivity κ, density ρ, specific heat capacity cp, and kinematic viscosity η, are constants and may be obtained from Roxworthy et al. "Understanding and controlling plasmon-induced convection." Nature Communications 5, 3173, doi:10.1038 (2014), the entire disclosure of which is incorporated by reference herein.

Perpendicularly incident light transmitting diffractively through the center aperture 24 is weakly also coupled to the plasmonic excitations and dissipated within the metal layer 14. Hence, a relatively low temperature increase from the ambient temperature of about 25° C. occurs within region of the center aperture 24. Significantly higher local temperatures above the ambient temperature may also be established outside the region of the center aperture 24 due to non-radiative decaying of surface plasmon polaritons excited on the surface of the metal layer 14. Due to limited thermal conductivity, the generated heat dissipates slowly into the fluid, establishing a convective current away from the outlet side 13. Contribution of this heat-induced convective flow in particle motion may be calculated using Boussinesq approximation of formula (12):

$$F_{tp}=g\rho_0\beta(T)[T(r)-T_0]\hat{z} \quad (12)$$

In formula (12), Ftp is the imposed volume force, g, ρ0, and β are the gravitational constant, water density, and thermal expansion coefficient of water, respectively.

The fluidic drag forces Fd acting on nanoparticles may be calculated using Stoke's relation shown in formula (13)

$$F_d=-6\pi\eta Rv \quad (13)$$

In formula (13), η is the viscosity of the liquid medium, v is the velocity of the particle relative to the liquid medium and R is the particle radius.

The microlens 10 according to the present disclosure may be used for label-free sorting of particles, i.e., exosome size bioparticles. The robust size selective separation capability of microlens 10 is realized by harnessing the varying strength of optical scattering (Fs), thermo-plasmonic convection (Ftp), fluidic drag (Fd) and gravitational (W) forces based on size, refractive index, and mass density of the bioparticles. In addition, one or both of the fluidic flow rate and the incident light power may be adjusted to tune selective separation particles based on particle size as described in further detail in Example 3.

Minor differences in internal structure and chemical composition of bioparticles leads to effective refractive index variations that can be exploited for selective separation, e.g., cells with single gene modifications, can be distinguished based on their differences in chemical makeup using optical chromatography. Based on the same physical principles, the microlens 10 utilizes optical scattering, thermo-plasmonic convection, and fluidic drag forces to provide a highly sensitive refractive index-based bioparticle separation capability.

It is further envisioned, that multiple microlenses 10 may be integrated on a single planar substrate, such as an integrated circuit and/or part of a lab-on-chip (LOC) device. In further embodiments, a plurality of the microlenses 10 can be serially implemented to achieve differential sorting using an initial size-based fractionation and a subsequently separation based on differences in bioparticle chemical makeup due to differences in refractive index as described in more detail in Example 2.

Unlike existing optical chromatography techniques that require complicated instrumentation (e.g., lasers, objectives, precise stages, etc.) for optofluidic alignment and optical scattering force creation, the microlens 10 according to the present disclosure achieves objective-free focusing of collimated broadband light and self-alignment of counteracting optical scattering and fluidic drag forces along the optical axis. To accomplish this, the microlens 10 having a sub-wavelength thickness merges focusing capabilities of NHA plasmonic microlenses with nanofluidics. The microlens 10 realizes precise alignment of nanoparticles along the optical axis using radially focusing fluidic drag and optical gradient forces.

The microlens 10 also facilitates selective separation of nanoparticles below a threshold diameter, which can be tuned to a desired value using fluidic flow rate and power of the incident. Furthermore, the microlens 10 offers a robust separation capability even for same size nanoparticles using differences in their chemical composition based on their refractive index.

A major limitation in conventional flow cytometry measurements is the diminished optical signals obtained from small size nano-bioparticles, such as exosomes, which have and lower refractive indices as disclosed in van der Pol et al. "Innovation in detection of microparticles and exosomes," Journal of Thrombosis and Haemostasis 11, 36-45, doi:doi: 10.1111/jth.12254 (2013), the entire disclosure is incorporated by reference herein. Even with specialized flow cytometers equipped with high sensitivity detectors, the smallest detectable vesicles are typically larger than about 200 nm in diameter. Hence, vast majority of exosomes are overlooked in flow cytometry measurements, which is the most commonly used optical method in clinical and research laboratories. In contrast, the microlens 10 and devices based thereon employ a negative depletion mechanism enabling selective enrichment of exosomes by removing the larger size and higher refractive index particles using optical radiation pressure.

Furthermore, the microlens 10 may be used for quantification of exosomes passing through the center aperture 24 using Coulter principle. With reference to FIG. 3, two electrodes 60 and 62 may be added on the opposite sides of the microlens 10. More specifically, a first electrode 60 on the side of the inlet side 11 and a second electrode 62 on the side of the outlet side 13 of the microlens 10. The first and second electrodes 60 and 62 are configured to detect brief changes (e.g., pulses) in the current that flows through the center aperture 24, as the enriched exosomes transverse the center aperture 24.

It has been previously shown that resistive pulse sensing (RPS) technologies based on Coulter principle in aperture format are capable of detecting bioparticles smaller than 100 nm. However, clogging of openings due to the larger particles has been a practical limitation when heterogenous samples are analyzed. Since the microlens 10 keeps larger diameter particles away from the center aperture 24 using optical scattering forces, when combined with RPS, the microlens 10 overcomes these limitations and may be used for selective sorting and detection of exosomes from heterogenous samples. To achieve extended periods of operation and high-volume processing, it is envisioned that a lateral microcross flow may also be incorporated to periodically remove the particle microfumes that build up above the focal point of the microlens 10.

The following Examples illustrate embodiments of the present disclosure. These Examples are intended to be illustrative only and are not intended to limit the scope of the present disclosure. Also, parts and percentages are by weight unless otherwise indicated. As used herein, "room temperature" or "ambient temperature" refers to a temperature from about 20° C. to about 25° C.

EXAMPLES

Example 1

This example describes effect of diameter dc size of center aperture on performance of the microlens.

Four microlenses as shown in FIGS. 1 and 2 and described above were prepared each having a different sized center aperture. First microlens did not have a center aperture (dc=0), a second microlens had a center aperture with same as the diameter of the apertures (dc of about 150 nm), a third microlens had an enlarged center aperture (dc of about 500 nm), and a fourth microlens had a significantly larger center aperture (dc of about 800 nm).

Figure 4:
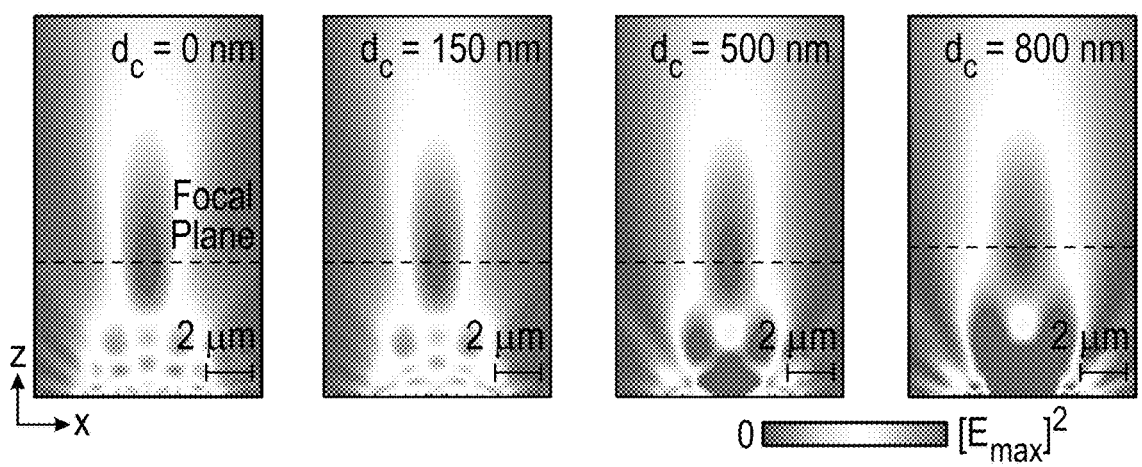
FIG. 4 shows focused beam profiles for microlenses with varying center aperture diameters exposed to a light source having an amplitude of about 655 nm according to the present disclosure.

In FIG. 4, intensity profiles of optofluidic plasmonic microlenses with varying center aperture diameters dc are shown for an incident light beam having a wavelength of about 633 nm. It was observed the center aperture having a diameter dc of about 500 nm had negligible effect on the focusing behavior. Even for significantly larger diameter dc of about 800 nm, the microlens focuses light to a tight spot, albeit with a lower efficiency (i.e. degraded focusing characteristics). The checkerboard-like intensity profile close to the inlet side 11 was due to the diffractive self-imaging of smaller size apertures around the center aperture caused by a so-called "plasmonic Talbot effect." The enhanced light intensity regions around the larger diameter center apertures having diameters dc of about 500 nm and 800 nm is associated with the diffractive transmission of light through the enlarged center aperture.

Figure 5A:
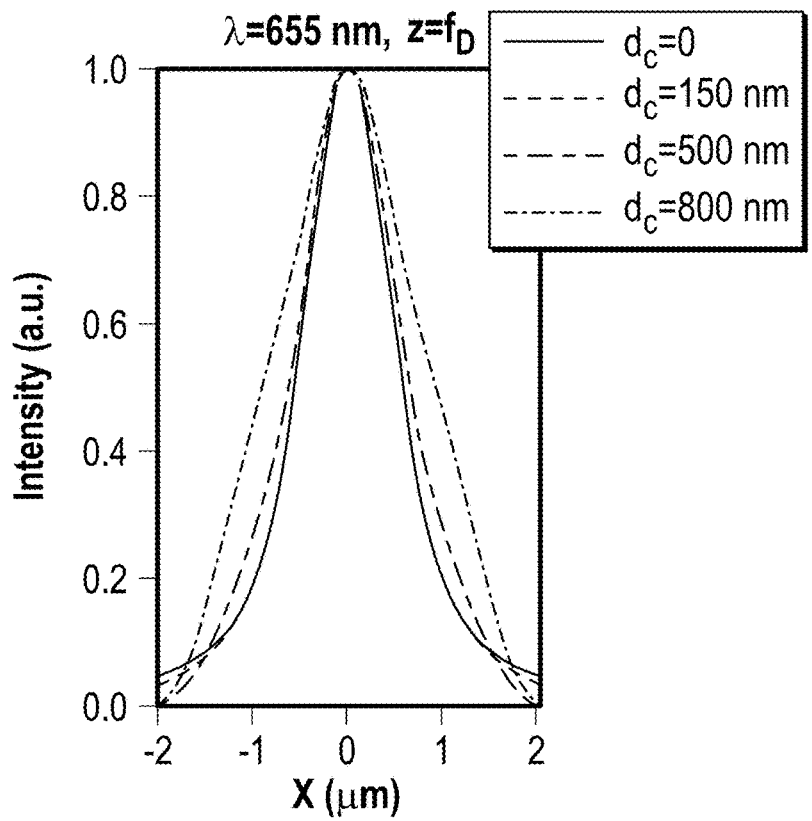
FIG. 5A shows intensity plots of field profiles along the focal plane of focused beam profiles of FIG. 4.

As shown in FIG. 5A, for large enough center opening (e.g. diameter dc being equal to or above 500 nm), the light intensities in these diffractive transmission regions are comparable to or higher than those at the focal point. However, in contrast to the focal point, fluidic drag forces (Fd∝v) are much stronger than the optical scattering forces (Fd>>Fs) in these diffractive transmission regions.

With reference to FIG. 3, fluidic flow velocities close to the center aperture were enhanced by about three orders of magnitude as the fluidic velocity increases rapidly due the fluidic flow squeeze through the center aperture 24 having a diameter dc of 500 nm. Hence, smaller particles 34 that are filtered through the focal point region can follow the fluidic flow lines to the outlet side 13 of the microlens 10 without hindrance in the diffractive transmission regions close to center aperture. Therefore, the design of microlens 10 is optimized for the focal point where comparable strength optical scattering, thermo-plasmonic convection, and fluidic drag forces are readily created for selective sorting purposes.

Figure 5B:
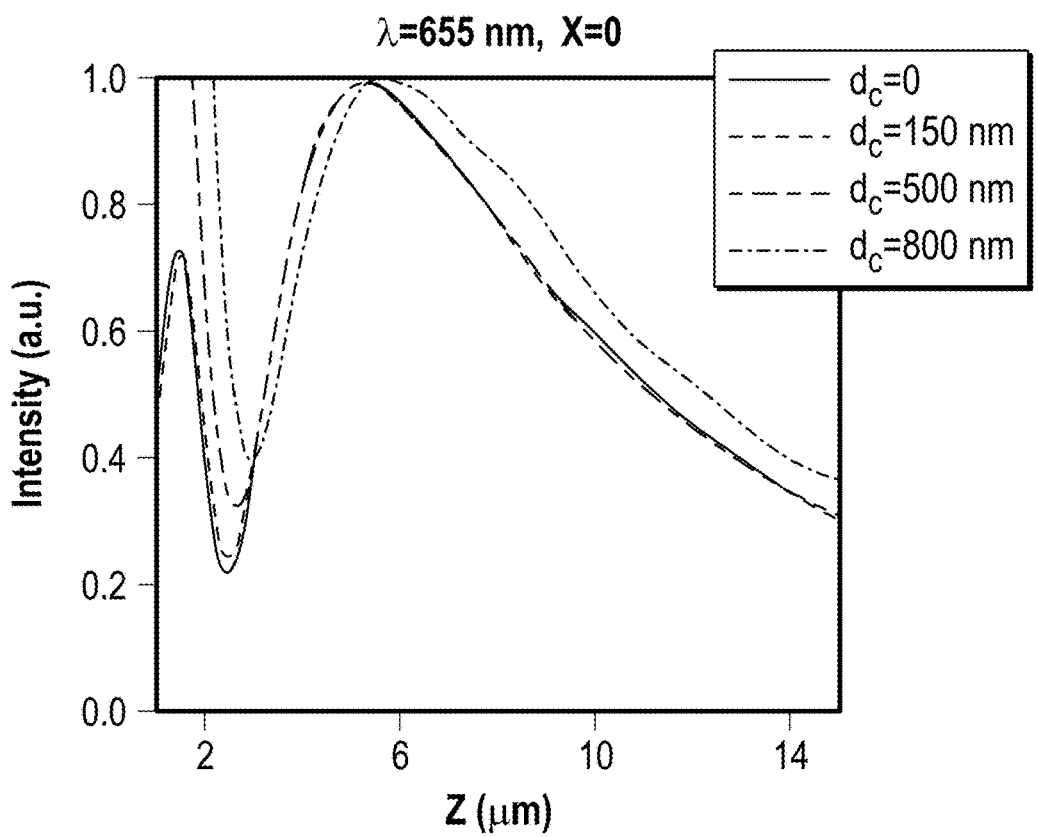
FIG. 5B shows intensity plots of focal length and depth of focus of the microlenses along the optical axis of focused beam profiles of FIG. 4.
Figure 5C:
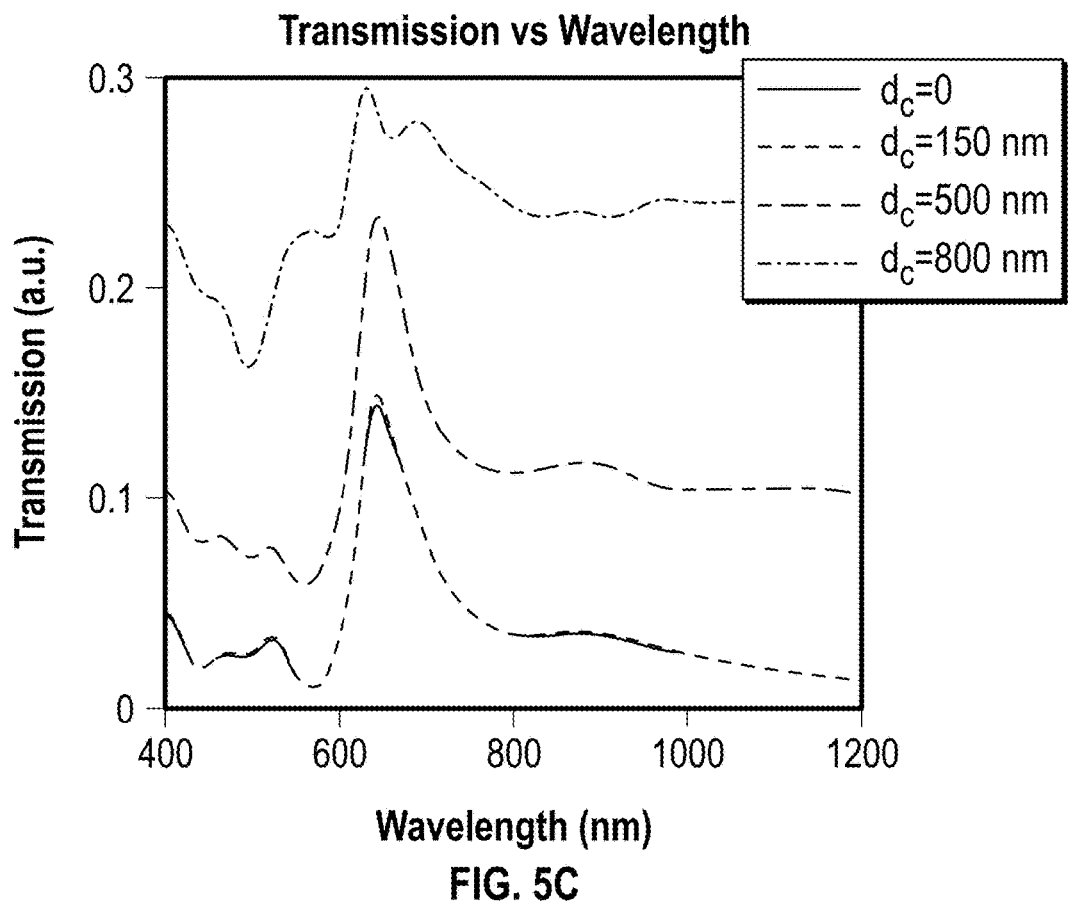
FIG. 5C shows plots of transmission spectra of focused beam profiles of FIG. 4.

An enlarged center aperture minimally affects the focal distance fD, as shown in FIG. 5B. The focal distance fD is about 5.32 µm for diameter dc being 0 nm, 150 nm, and 500 nm, whereas focal distance fD slightly increases to about 5.56 µm for diameter dc being 800 nm. Similarly, a wider focal spot size where z is about equal to fD was observed for microlenses with larger center apertures (FIG. 5C). For microlenses without the center aperture (dc of 0 nm) and where the center aperture has a diameter dc about 150 nm, spot sizes were almost identical with a full-width at half maximum (FWHM) spread of w of about 1.12 µm. For diameter dc 500 nm, w increased with increasing center aperture opening; for dc of about 500 nm and about 800 nm, it was observed that the spot sizes w were about 1.24 µm and 1.80 µm, respectively. Focusing characteristics of optofluidic plasmonic microlenses are mainly controlled by the smaller diameter aperture array formed around the center enlarged aperture.

Transmission spectra were obtained using a field monitor and are shown in FIG. 5D. EOT effect occurred at wavelengths that satisfied the Bragg condition expressed by formula (14):

$$\vec{G} = i\vec{G}_x + j\vec{G}_y \tag{14}$$

In formula (14), (i, j) are the integer values for the corresponding grating order. In FIG. 5D, the grating coupled (1,0) resonance transmission peak was observed at about 650 nm with FWHM of about 55 nm, confirming that light focusing was due to interference of in-phase photons emerging from the periodic small size array of apertures. For center apertures with diameters dc up to about 500 nm (FIG. 5D, middle curve), transmission spectra showed minimal deviation from a uniform microlens without a center aperture (dc=0), albeit with some broadband background transmission. On the other hand, for significantly larger center openings (diameter dc of about 800 nm), non-resonant light transmission through the center aperture increased, leading to an increased background signal and broadening of the resonant transmission peak (FIG. 5D, top curve). Based on the focusing behavior, attainable fluidic flow velocities at the focal point, and transmission spectra discussed above, it was determined that an optofluidic plasmonic microlens consisting of 9×9 array of nanoholes (diameter dc of about 150 nm and a periodicity a0 of about 380 nm) with a center aperture having diameter dc of about 500 nm was suitable for sorting of small size particles, such as exosomes.

Figure 6:
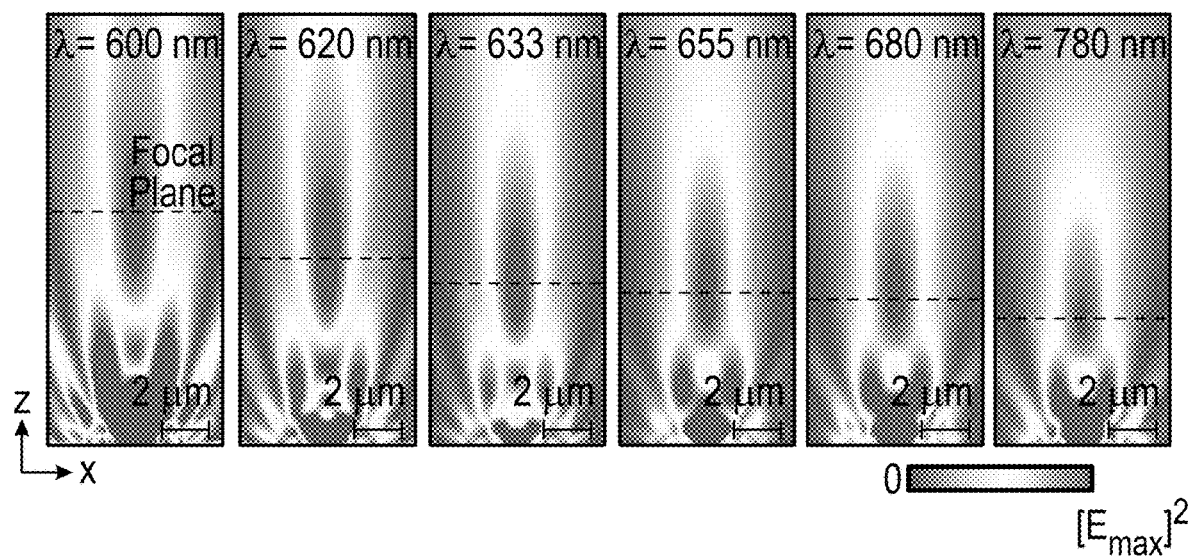
FIG. 6 shows focused beam profiles for microlens having a center aperture with a diameter of about 500 nm as a function incident light wavelength according to the present disclosure.
Figure 7A:
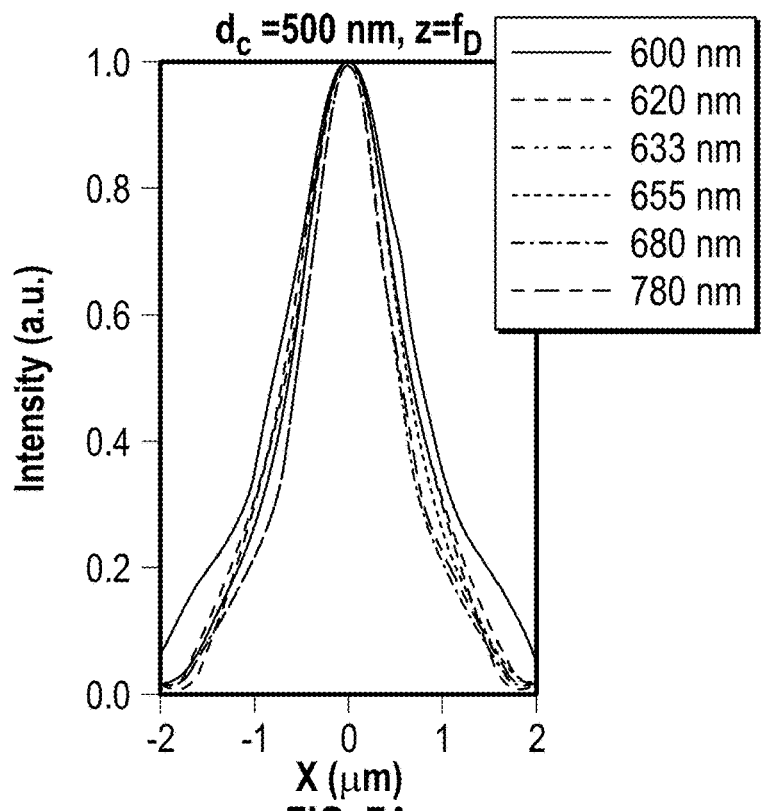
FIG. 7A shows intensity plots of field profiles along the focal plane of focused beam profiles of FIG. 6.
Figure 7B:
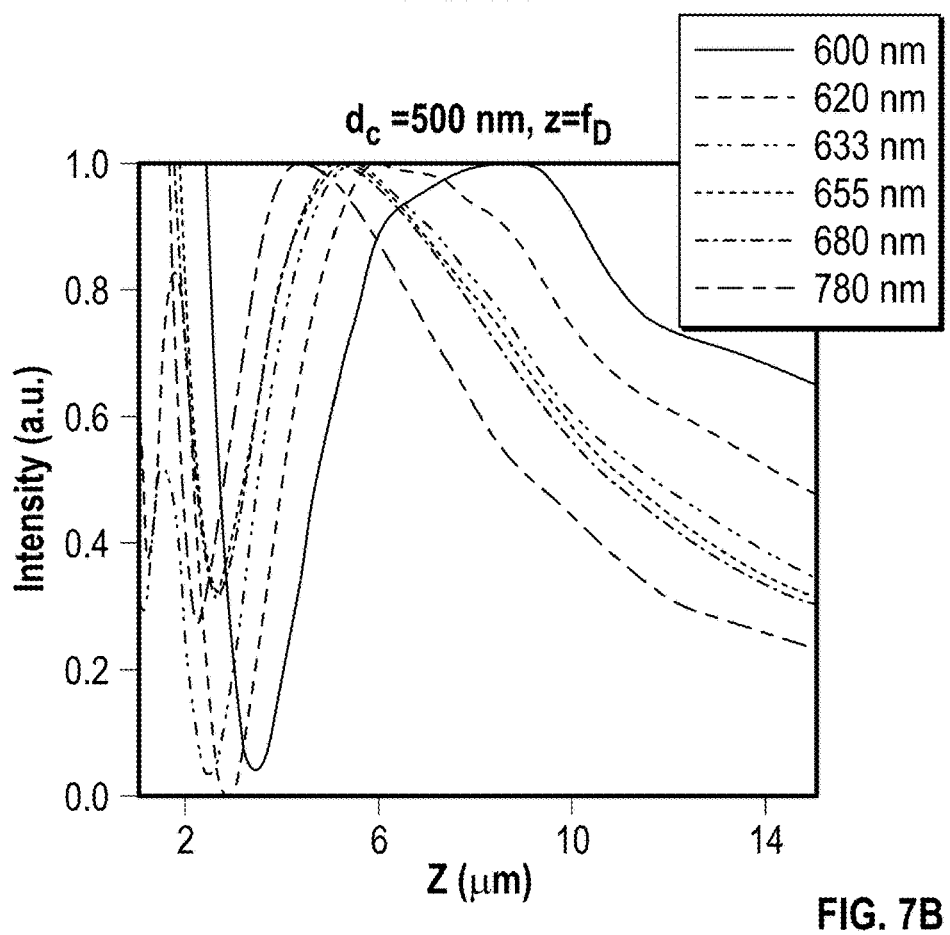
FIG. 7B shows intensity plots of focal length and depth of focus of the microlenses along the optical axis of focused beam profiles of FIG. 6.

The effect of center aperture on the broadband focusing characteristics of the microlens was also analyzed for a light wavelength range from about 600 nm to about 780 nm. FIG. 6 shows intensity profiles of the microlens at wavelengths of about 600 nm, of about 620 nm, of about 633 nm, of about 655 nm, of about 680 nm, and of about 780 nm. The intensity profiles of FIG. 6 shows that focal distance fD decreases monotonically with increasing wavelength. However, a particularly small focal length variation Δz of about 200 nm was observed for the wavelength from about 620 nm to about 680 nm corresponding to the (1,0) resonant transmission (EOT) peak. Outside the EOT spectral window, a significantly longer focal length was observed at the transmission minimum wavelength of about 600 nm. Focal spot size (w) was calculated along the focal plane denoted by the horizontal dashed lines in FIG. 6. Within the (1,0) resonant transmission peak, only a slight difference was observed for the focal spot size. As shown in FIG. 7A, w is about 1.08 µm, about 1.12 µm, about 1.24 µm, and about 1.28 µm at wavelength µ of about 620 nm, of about 633 nm, of about 655 nm and about 680 nm, respectively. Similarly, light intensity profile along the optical axis presented minimal variations for the wavelength from about 620 nm to about 680 nm (FIG. 7B). Accordingly, it was confirmed that the (1,0) resonance transmission (EOT) peak provided a focusing behavior that was unaltered over a sufficiently-broad range of wavelengths.

The focal length of a finite-size opening that has identical dimensions to our plasmofluidic microlens can be calculated using the Rayleigh-Sommerfeld (R-S) formula (15):

$$\frac{dI}{dz} = -2I_0 \frac{\pi \rho^2}{\lambda z^2} \sin\left(\frac{\pi \rho^2 n}{\lambda z}\right) = 0 \tag{15}$$

Figure 7C:
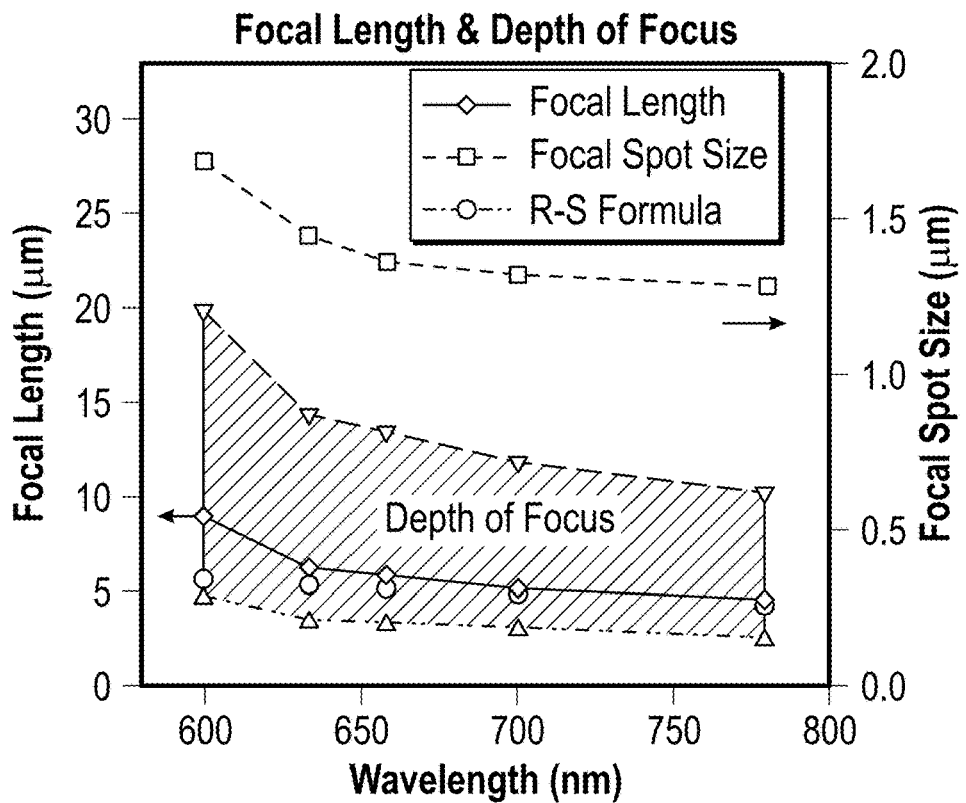
FIG. 7C shows plots of focal length, depth of focus, and focal spot size as a function of wavelength of FIG. 6.

In formula (15), z is the distance above the microlens, I and I0 are intensity and its peak values, respectively, whereas ρ is the radius of the center opening and n is the refractive index of the surrounding medium. It was determined that focal length fD of the microlens was shown in FIG. 7C was in agreement with the values obtained from R-S formula (15) (shown as dots in FIG. 7C) for the wavelength from about 620 nm to about 680 nm. Depth of focus (DoF) of the microlens (shaded area bounded by two curves) is shown in FIG. 7C. Even though the periodicity of the array of the microlens is broken with the incorporation of the center aperture having a diameter dc of about 500 nm, it was confirmed that the microlens according to the present disclosure provides a well-defined focusing behavior with minimal chromatic aberration for the wavelength from about 620 nm to about 680 nm.

Example 2

This example describes label-free sorting of exosome size bioparticles.

The robust size selective separation capability of microlens 10 according to the present disclosure was realized by harnessing the varying strength of optical scattering (Fs), thermo-plasmonic convection (Ftp), fluidic drag (Fd) and gravitational (W) forces based on size, refractive index and mass density of the bioparticles. The net forces (Fnet=Fs+Ftp−Fd−W) acting on submicron particles, particles having a size from about 100 nm to about 1 μm at different locations along the optical axis (z=0-6 μm) are shown in FIGS. 8A-B and 9A-B.

Figure 8A:
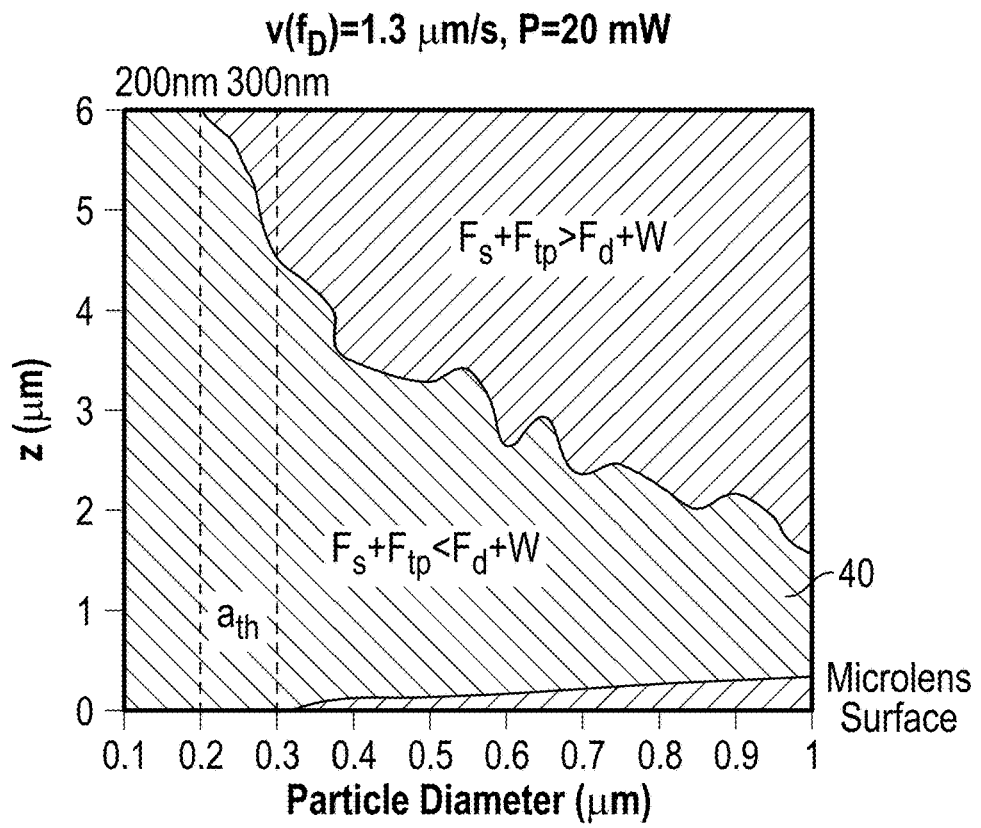
FIG. 8A shows plots of net force acting on submicron particles at a flow rate of about 1.3 μm/s along an optical axis of the microlens of FIG. 1 according to the present disclosure.
Figure 8B:
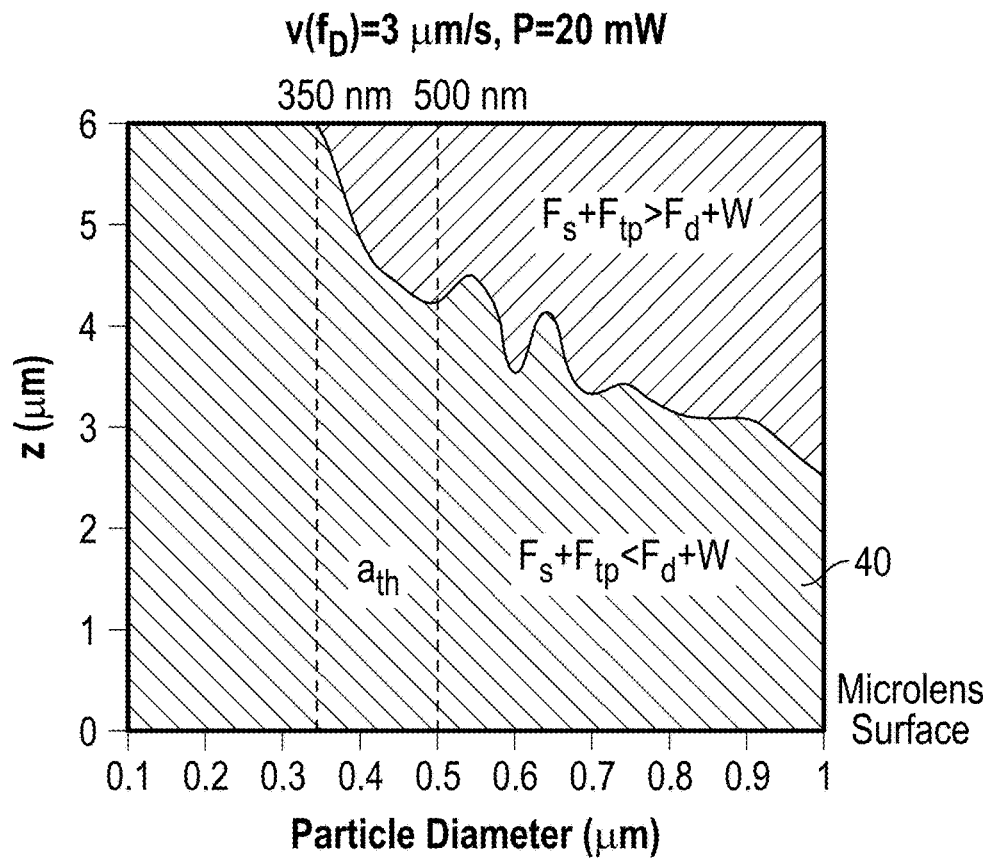
FIG. 8B shows plots of net force acting on submicron particles at a flow rate of about 3 μm/s along an optical axis of the microlens of FIG. 1 according to the present disclosure.

In particular, the particles had a refractive index of about 1.55 and a mass density of about 1.05 g/cm3. In FIGS. 8A-B, regions 40 corresponds to physical conditions (e.g., particle sizes and spatial locations along the optical axis) leading to a net force towards the center aperture 24. Particles with a small diameter (diameter ath being below 200 nm), were exposed to about 20 mW incident light having a wavelength of about 633 nm and a fluidic flow velocity of about 1.3 μm/s. Optical scattering and thermo-plasmonic convention forces were observed to be weaker than the fluidic drag and gravitational forces (Fd+W>Fs+Ftp) at all locations along the optical axis (FIG. 8A, the left vertical line). Hence, small diameter particles readily followed the fluidic flow lines along the focal point and the high-intensity regions close to the center aperture 24. These particles make their way through the center aperture 24 to the outlet side 13 of the microlens 10 and get separated from the fluid in the top channel (negative depletion). Under the same operating conditions, larger diameter particles (diameter ath being above 200 nm) experienced stronger optical scattering and thermo-plasmonic convection forces that can push them against the fluidic flow lines (Fd+W<Fs+Ftp). These larger bioparticles were retained in the top channel (FIG. 8A). Threshold bioparticle diameter ath used for the size-based fractionation were readily tuned to a desired value by changing the light intensity and the fluidic flow velocity. In FIG. 8B, the increased fluidic flow, at a velocity of about 3.0 μm/s, shifted the threshold diameter (ath) for size-based sorting to about 350 nm. By fine-tuning the relative contributions of the optical scattering, thermo-plasmonic convection and fluidic drag forces, microvesicles (up to about 500 nm in diameter) can be selectively separated from larger bioparticles.

Figure 9A:
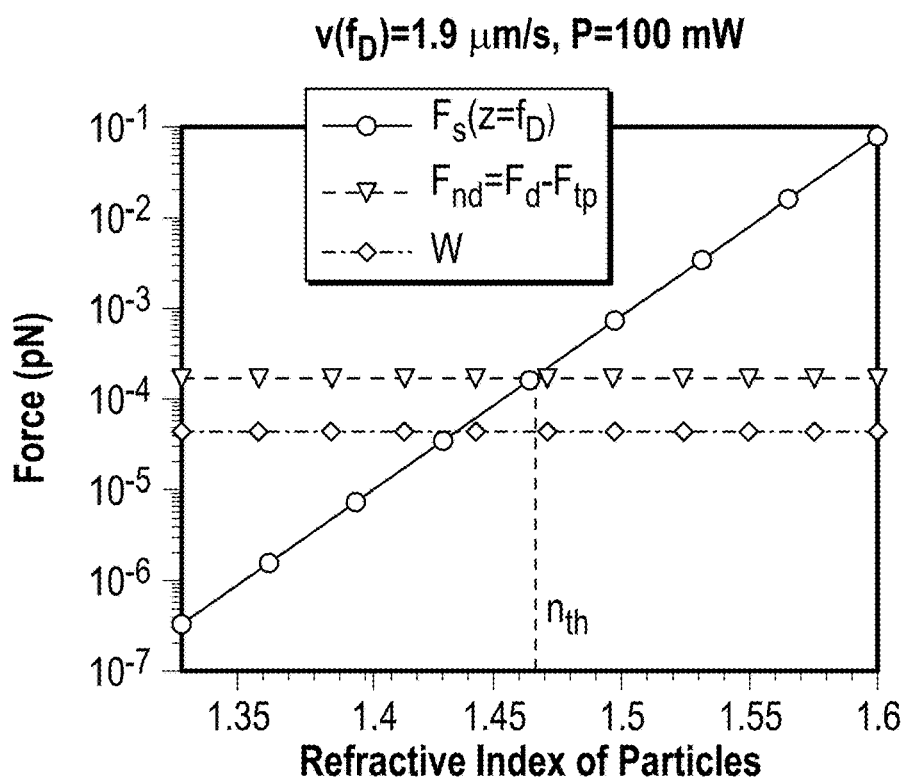
FIG. 9A shows plots of optical scattering, net fluidic drag, and gravitational forces acting on a 200 nm bioparticle as a function of a refractive index of the bioparticle at a flow rate of about 1.3 μm/s along an optical axis of the microlens of FIG. 1 according to the present disclosure.

In FIG. 9A, optical scattering Fs and net fluidic drag Fd−Ftp forces are compared at the focal point (fD of about 5.32 μm, □ of about 633 nm, and P of about 100 mW) as a function of effective refractive index (ne) of bioparticles with a diameter a of about 200 nm. Gravitational forces (W) acting on these particles are also shown in FIG. 9A. The optical scattering forces Fs were calculated for an effective refractive index ne from about 1.33 (i.e., water) to about 1.6 (i.e., polystyrene particles). It was observed that Fs increases with increasing ne and balances the net fluidic resistance force Fd−Ftp for the refractive index ne of about 1.46 (i.e., phospholipids and proteins) at a flow rate v(fD) of about 1.9 μm/s. For particles that have refractive indices ne lower than about 1.46, the fluidic drag forces are strong enough to carry them against the optical scattering forces through the center aperture 24 to a chamber below the microlens 10 and separate them from a heterogenous mixture. This allows sorting of lower refractive index (ne of less than about 1.46) particles from higher refractive index (ne of more than about 1.46) particles.

Figure 9B:
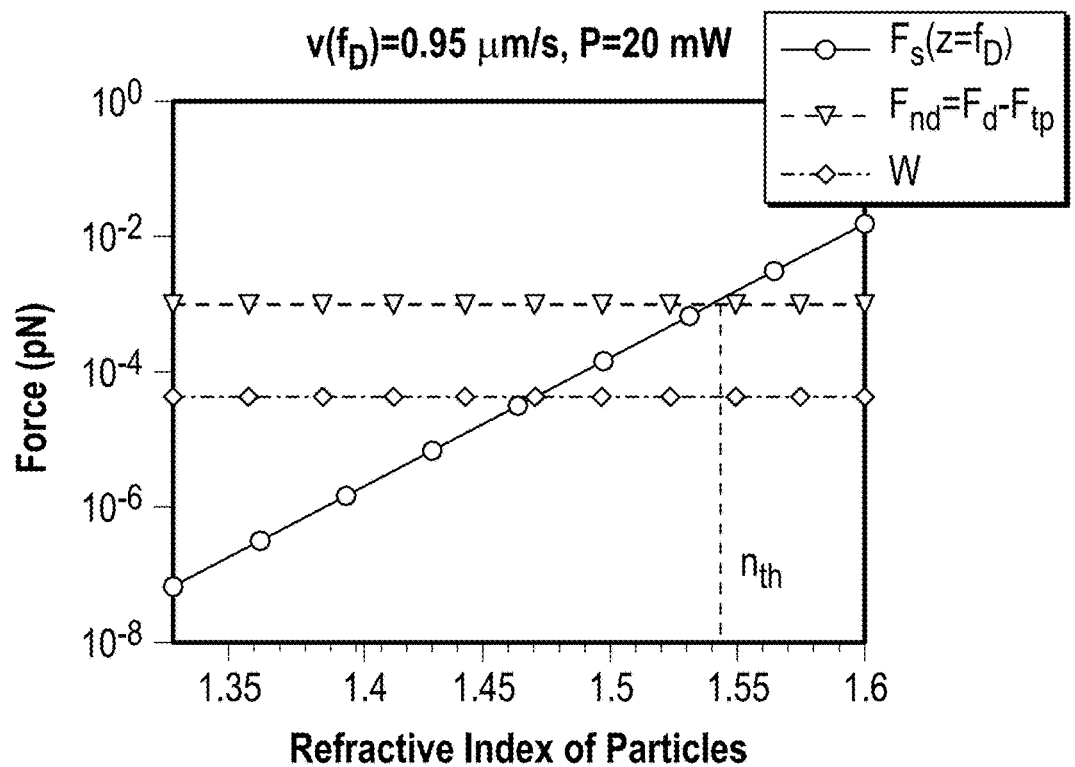
FIG. 9B shows plots of optical scattering, net fluidic drag, and gravitational forces acting on a 200 nm bioparticle as a function of a refractive index of the bioparticle at a flow rate of about 0.95 μm/s along an optical axis of the microlens of FIG. 1 according to the present disclosure.

It was observed that the significantly diminished optical scattering forces, approximately 4 aN, obtained for the lower refractive index (ne of from about 1.37 to about 1.39) particles, which was two order of magnitude weaker than the optical scattering forces, approximately 400 aN, acting on higher refractive index particles with ne of about 1.46 under same illumination conditions. Exosomes consisting of a thin phospholipid membrane enclosing a water load have lower effective refractive indices (nexosome of from about 1.37 to about 1.39) that are closer to the refractive index of water (nwater of about 1.33). Virions, which are a tight assembly of nucleid acids, proteins, and lipids, have higher refractive indices (nvirus of about 1.48). The microlens 10 allowed for use of the refractive index difference to separate exosomes from similar size virions as shown in FIG. 9A. Similar to the size-based separation as shown in FIGS. 8A-B, the threshold refractive index can be tuned to a desired value by adjusting the fluidic flow rate and light power as shown in FIG. 9B. With reference to FIG. 9B, at a relatively small flow rate, of about 0.95 μm/s, and incident power of about 20 mW, the net force (Fs+Ftp−W−Fd) acting on the particles having a diameter of about 200 nm, vanishes for particles with higher refractive index (ne of about 1.54) when compares with particles having a lower refractive index (ne of about 1.46) as shown in FIG. 9A. Thus, it was observed that the fluidic flow rate and light power also affect the threshold refractive index.

Example 3

This example describes radial focusing of the bioparticles.

It was predicted that the instrumental fluctuations associated with variations in fluidic flow velocities can cause spatial dispersion of particles, deteriorating the size-based retention capability of conventional optical chromatography approaches. Instead of mildly focused Gaussian beams used in optical chromatography, the microlens 10 according to the present disclosure uses strongly focused the light that creates large optical gradient forces Fg in radial directions.

Figure 10A:
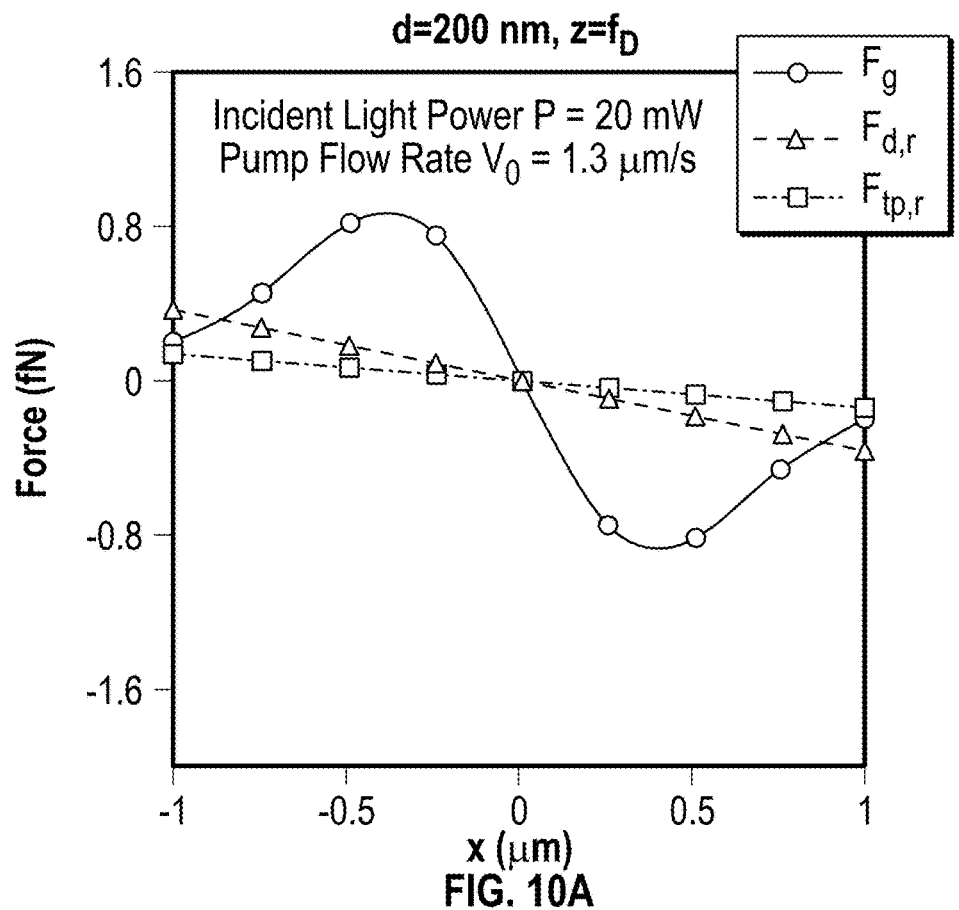
FIG. 10A shows plots of optical gradient, radial fluidic drag, and radial thermo-induced fluidic drag as a function of particle trajectories for particles having an average diameter of about 200 nm along an optical axis of the microlens of FIG. 1 according to the present disclosure.
Figure 10B:
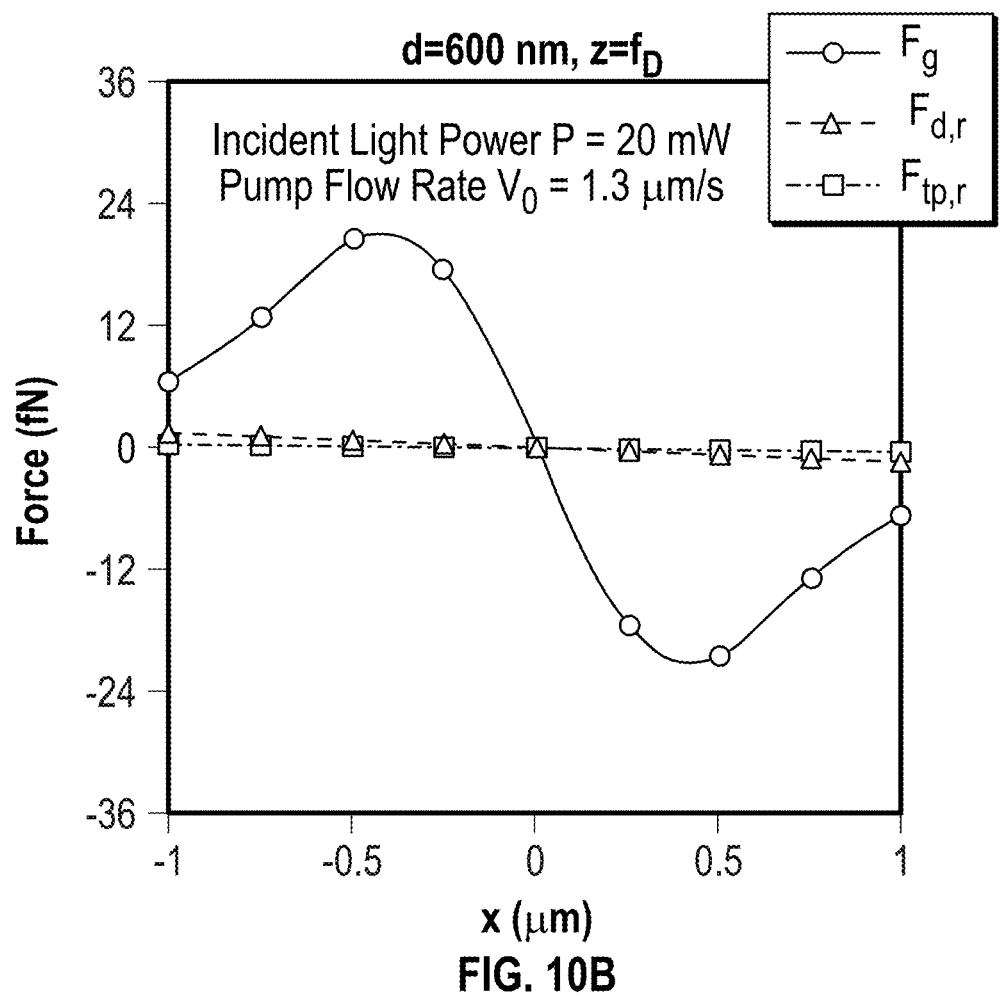
FIG. 10B shows plots of optical gradient, radial fluidic drag, and radial thermo-induced fluidic drag as a function of particle trajectories for particles having an average diameter of about 600 nm along an optical axis of the microlens of FIG. 1 according to the present disclosure.

FIGS. 10A-B show plots for particles having a diameter of about 200 nm and particles having a diameter of about 600 nm, respectively. In addition to the optical gradient forces Fg, the spatial dispersion of particles in the microlens 10 is inherently minimized by the fluidic drag Fd,r, and thermo-plasmonic convection Ftp,r, which interact together to align particles along the optical axis (r=0). For both particle sizes incident light having an amplitude of about 633 nm and power of about 20 mW and a fluidic velocity of about 1.3 μm/s. For distances up to ±1 □m away from the optical axis, the optical gradient (Fg), thermo-plasmonic convective flow (Ftp,r) and fluidic drag (Fd,r) forces act as a restoring force of a spring, which tends to align the particles at equilibrium position (long the optical axis. This effect illustrates the relative strength of the optical gradient forces Fg with respect to the radial fluidic drag forces Fd,r. Although particles were initially brought towards the microlens 10 through the fluidic flow, once the particles were close to high intensity focal point region, their relative alignment along the optical axis was mainly ensured by the optical gradient force Fg. Therefore, the plasmofluidic optical chromatography technique according to the present disclosure provides a self-collimating mechanism for particle trajectories that is tolerant of the perturbations in fluidic flow rates.

It will be appreciated that of the above-disclosed and other features and functions, or alternatives thereof, may be desirably combined into many other different systems or applications. Various presently unforeseen or unanticipated alternatives, modifications, variations or improvements may be subsequently made by those skilled in the art which are also intended to be encompassed by the following claims. Unless specifically recited in a claim, steps or components of claims should not be implied or imported from the specification or any other claims as to any particular order, number, position, size, shape, angle, or material.

What is claimed is:

1. An optofluidic sorting system comprising:
a plurality of optofluidic devices arranged in parallel, each optofluidic device of the plurality of optofluidic devices is configured to sort a particle having a particular size and includes:
  a housing having an inlet side and an outlet side;
  a microlens disposed within the housing between the inlet side and the outlet side, wherein a fluid having a plurality of particles flows from the inlet side through the microlens to the outlet side; and
  a light source configured to emit a light beam in a direction opposite flow direction of the fluid, the light beam defining an optical axis that is perpendicular to the microlens.

2. The optofluidic sorting system according to claim 1, wherein the microlens includes a metal layer, a membrane layer, and an adhesion layer disposed between the metal layer and the membrane layer.

3. The optofluidic sorting system according to claim 2, wherein the metal layer is formed from gold and has a thickness of about 120 nm.

4. The optofluidic sorting system according to claim 2, wherein the adhesion layer is formed from titanium and has a thickness of about 10 nm.

5. The optofluidic sorting system according to claim 2, wherein the membrane layer is a suspended silicon nitride membrane having a thickness of about 100 nm.

6. The optofluidic sorting system according to claim 1, wherein the microlens has a thickness that is less than a wavelength of the light beam.

7. The optofluidic sorting system according to claim 1, wherein the microlens includes an array of apertures having a diameter of about 150 nm.

8. The optofluidic sorting system according to claim 7, wherein the microlens includes a center aperture disposed at a center of the array, the center aperture having a diameter from about 150 nm to about 800 nm.

9. The optofluidic sorting system according to claim 8, wherein the microlens includes a center aperture disposed at a center of the array, the center aperture having a diameter of about 500 nm.

10. The optofluidic sorting system according to claim 1, wherein the microlens is configured to selectively sort the plurality of particles based on at least one of particle size or refractive index of the plurality of particles.

11. The optofluidic sorting system according to claim 1, wherein adjustment of at least one of intensity of the light beam or fluid flow rate adjusts selectivity of the microlens.

12. A method for selectively sorting a plurality of particles disposed in a fluid through an optofluidic device, the method comprising:
supplying a fluid including a plurality of particles of different sizes to an inlet side of a housing of each optofluidic device of a plurality of optofluidic devices;
removing the fluid from an outlet side of the housing of each optofluidic device of the plurality of optofluidic devices;
passing the fluid through a microlens of each optofluidic device of the plurality of optofluidic devices, the microlens disposed within the housing between the inlet side and the outlet side, wherein the fluid flows from the inlet side through the microlens to the outlet side; and
emitting a light beam from a light source of each optofluidic device of the plurality of optofluidic devices in a direction opposite flow direction of the fluid, the light beam defining an optical axis that is perpendicular to the microlens thereby sorting the plurality of particles based on size.

13. The method according to claim 12, wherein the microlens includes a metal layer, a membrane layer, and an adhesion layer disposed between the metal layer and the membrane layer.

14. The method according to claim 13, wherein the metal layer is formed from gold and has a thickness of about 120 nm.

15. The method according to claim 13, wherein the adhesion layer is formed from titanium and has a thickness of about 10 nm.

16. The method according to claim 13, wherein the membrane layer is a suspended silicon nitride membrane having a thickness of about 100 nm.

17. The method according to claim 12, wherein the microlens has a thickness that is less than a wavelength of the light beam.

18. The method according to claim 12, wherein the microlens includes an array of apertures having a diameter of about 150 nm.

19. The method according to claim 18, wherein the microlens includes a center aperture disposed at a center of the array, the center aperture having a diameter from about 150 nm to about 800 nm.

20. The method according to claim 19, wherein the microlens includes a center aperture disposed at a center of the array, the center aperture having a diameter about 500 nm.

21. The method according to claim 12, further comprising:
selectively sorting the plurality of particles based on at least one of particle size or refractive index of the plurality of particles.

22. The method according to claim 12, further comprising:
adjusting one of at least one of intensity of the light beam or fluid flow rate to adjust selectivity of the microlens.

* * * * *